United States Patent [19]

Heinze et al.

[11] Patent Number: 4,499,261

[45] Date of Patent: Feb. 12, 1985

[54] PROCESS FOR THE CONTINUOUS PRODUCTION OF POLYBUTYLENE TEREPHTHALATE OF HIGH MOLECULAR WEIGHT

[75] Inventors: Helmut Heinze, Frankfurt am Main; Fritz Wilhelm, Karben; Klaus Mackensen; Ferdinand Finkeldei, both of Frankfurt am Main, all of Fed. Rep. of Germany

[73] Assignee: Davy McKee AG, Fed. Rep. of Germany

[21] Appl. No.: 582,289

[22] Filed: Feb. 22, 1984

[51] Int. Cl.$^3$ .............................................. C08G 63/34
[52] U.S. Cl. .................................... 528/279; 528/480
[58] Field of Search ............................... 528/279, 480

[56] References Cited

U.S. PATENT DOCUMENTS

| | | | |
|---|---|---|---|
| 3,940,367 | 2/1976 | Pelousek et al. | 528/279 X |
| 4,014,858 | 3/1977 | Chipman et al. | 528/283 |
| 4,329,444 | 5/1982 | Borman | 528/279 |

*Primary Examiner*—Lucille M. Phynes
*Attorney, Agent, or Firm*—Allegretti, Newitt, Witcoff & McAndrews, Ltd.

[57] ABSTRACT

Continuous multistep, economical, energy-saving process for making polybutylene terephthalate in which the butanediol-1,4 used to transesterify dimethyl terephthalate is supplied from the condensed vapors volatilized during the precondensation and polycondensation steps of the process. These vapors, which contain low-soluble esters of terephthalic acid as well as butanediol, are condensed by contact with fresh butanediol, and volatilized butanediol containing the esters is recycled to the initial transesterification stage for reaction with dimethyl terephthalate. No additional butanediol is required for the reaction.

7 Claims, 1 Drawing Figure

PROCESS FOR THE CONTINUOUS PRODUCTION OF POLYBUTYLENE TEREPHTHALATE OF HIGH MOLECULAR WEIGHT

The present invention relates to the continuous production of polybutylene terephthalate of high molecular weight from butanediol-1,4 and dimethyl terephthalate in the presence of a catalyst. More particularly, it relates to an economical and energy-saving process in which the butanediol-1,4 reactant is used first to condense vapors generated in the condensation stages of the process.

PRIOR ART

It is generally known in the art to produce polybutylene terephthalate by transesterification of dialkylesters of terephthalic acid with butanediol-1,4, and to carry out the subsequent polycondensation in the process of titanium catalysts as described, for example, in U.S. Pat. No. 3,635,899. causing it to become plugged. This results in vacuum failures, interruptions of production, and the loss of the esters causing the trouble.

We have also found that relatively large quantities of tetrahydrofurans were formed in the precondensation stages, resulting from decomposition of butanediol-1,4 (sometimes referred to as butanediol). It is desirable to preserve and reuse the excess butanediol-1,4 because it is very expensive, at the present time selling for 2.5 times the price of dimethyl terephthalate, the other reactant in the process. The decomposition, therefore, should be reduced to a minimum.

In accordance with the invention, a portion of the butanediol-1,4 fed to the transesterification reaction for the initial reaction with dimethyl terephthalate is butanediol-1,4 which has been used to condense vapors volatilized during the precondensation and polycondensation steps of the process. The remainder of the butanediol comes from the volatilized vapors themselves. It is not necessary to feed any fresh butanediol to the process other than that which goes to the condensers.

In addition to the economy effected by using the butanediol-1,4 both as a condensing agent and as a reactant, butanediol-1,4, at operating temperatures, dissolves the low-soluble esters volatilized from the condensation system and carries them back to the transesterification reactor in solution without clogging any of the elements of the apparatus. Low-soluble esters, as used in this specification, refer to those which contain almost one terephthalic acid group per molecule, for example, dimethyl terephthalate, methyl-4-hydroxybutyl terephthalate and bis-(4-hydroxybutyl)-terephthalate, and are increasingly soluble in butanediol-1,4 at increasing Discontinuous, or batch, processes have been described, for example, in U.S. Pat. Nos. 3,859,257 and 4,049,635. According to these specifications, the transesterification reaction in the first stage usually takes place at atmospheric pressure.

The art also discloses continuous production of polybutylene terephthalate. U.S. Pat. No. 4,056,514 teaches transesterifying dimethyl terephthalate with butanediol-1,4 at a mol ratio of 1:1.2–1.5, at temperatures progressively raising from 160° C. to 230° C. in the presence of a transesterification catalyst. Subsequently, the ester thus formed is precondensed at 230° C. to 270° C. at subatmospheric pressures between 2 to 20 torr within a residence time of 10 to 60 minutes. Polycondensation is then carried out a low pressure ranging between 0.1 to 2.0 torr. The patent also points out that the butanediol-1,4, together with small amounts of terephthalic acid esters, is drawn off from the vapor space in the polycondensation vessel, condensed and, if desired, reused after purification.

U.S. Pat. No. 4,239,882 discloses a batch process in which butanediol-1,4, present in an excess amount during transesterification, is distilled off during subsequent polycondensation, and reused as a starting material for the production of more polyester without any previous purification.

THE INVENTION

In conducting the precondensation and polycondensation reactions on a continuous basis, esters of low solubility, such as dimethyl terephthalate and methyl-4-hydroxybutyl terephthalate, may be carried over into the condensers, vacuum pumps and coolers comprising parts of the continuous apparatus. Frequently these esters freeze in the equipment, temperatures between 40° C. to 110° C.

The reduction in the tetrahydrofuran produced is attributable to the selection of critical operating parameters, namely the mol ratio, temperatures, pressures, residence times and quantity of catalysts employed. For this purpose, it is especially desirable to reduce the initial mol ratio of butanediol to dimethyl terephthalate in the first and subsequent stages; also to decrease the pressure, especially in the precondensation and polycondensation steps. The reduction in mol ratio significantly reduces the tetrahydrofuran formation, but at the expense of increased quantities of low-soluble esters in the precondensation and polycondensation condensates. However, in accordance with the invention, these normally troublesome low-soluble esters are kept in solution in the recycled butanediol fed to the condensers. They are present in the amount of 0.1% to 2% in the recycled butanediol, which is returned to the initial transesterification reactor. The amounts of butanediol fed to the condensers in the several stages are sufficient to completely dissolve all the esters. Thus, butanediol decomposition to tetrahydrofuran is minimized without concern for plugging the various pieces of apparatus and the lines connecting them because of the freezing of low-soluble esters.

The reduction of pressure to subatmospheric pressure in order to reduce the formation of tetrahydrofuran is preferably effected from the second stage on, that is, in the second transesterification reactor and in the precondensation and polycondensation reactors. The initial transesterification reactor is maintained at a temperature below 180° C. at superatmospheric pressure. This pressure increase is favorable for the limitation of foaming in stage 1. The second transesterification reactor is maintained at a temperature of between 180° C. to 210° C. at subatmospheric pressure. This increases the percentage of dimethyl terephthalate conversion, and reduces the tetrahydrofuran formation by about 0.3 mol %. It is especially important to decrease the pressure in the reactors when the temperature is above 210° C. A slight vacuum of 0.8 bar absolute was applied in the second transesterification reactor 195° C. But in the first precondensation reactor, the vacuum was reduced to 0.20 bar at 220° C. In these respects this invention differs from the prior art, as for example, U.S. Pat. No. 4,056,514, in which the pressure applied at 223° C. is still atmospheric. This pressure at this temperature increases the formation of tetrahydrofuran.

In accordance with the invention, the transesterification product from one reactor enters the lower part of the melt in the next successive reactor, which results in thorough mixing due to the process of evaporation, without requiring any agitating or transfer by pumping. By reducing the pressure in successive vessels, no equipment is required to convey the melt from one stage to the other, except a flow control pump in the feed line to the final polycondensation reactor.

In a preferred form of the invention, the fresh butanediol is fed to the condensers connecting to the precondensation reactor and the polycondensation reactor. Used butanediol coming from these condensers is pumped in part to the columns connecting to the first and second transesterification reactors. The small amount of dimethyl terephthalate evaporated in the transesterification stages is by this means washed out from the vapors and returned to the melt with ease.

As is well-known, the transesterification reaction results in the production of methanol, which is recovered as a byproduct. Methanol, in pure form, can be obtained by feeding to the condenser connecting to the first transesterification reactor, only that butanediol which has been previously used for condensing the vapors from the polycondensation reactor at a pressure, for example, of 1 to 2 mbar. Methanol of a lower degree of purity is obtained from the second transesterification reactor by condensing the vapors using butanediol from the precondensation stage.

The number of stages in the process beginning with the transesterification reactor and ending with the polycondensation of the polybutylene terephthalate may range from 4 to 8, preferably from 5 to 6.

DETAILED DESCRIPTION

Figure 1:
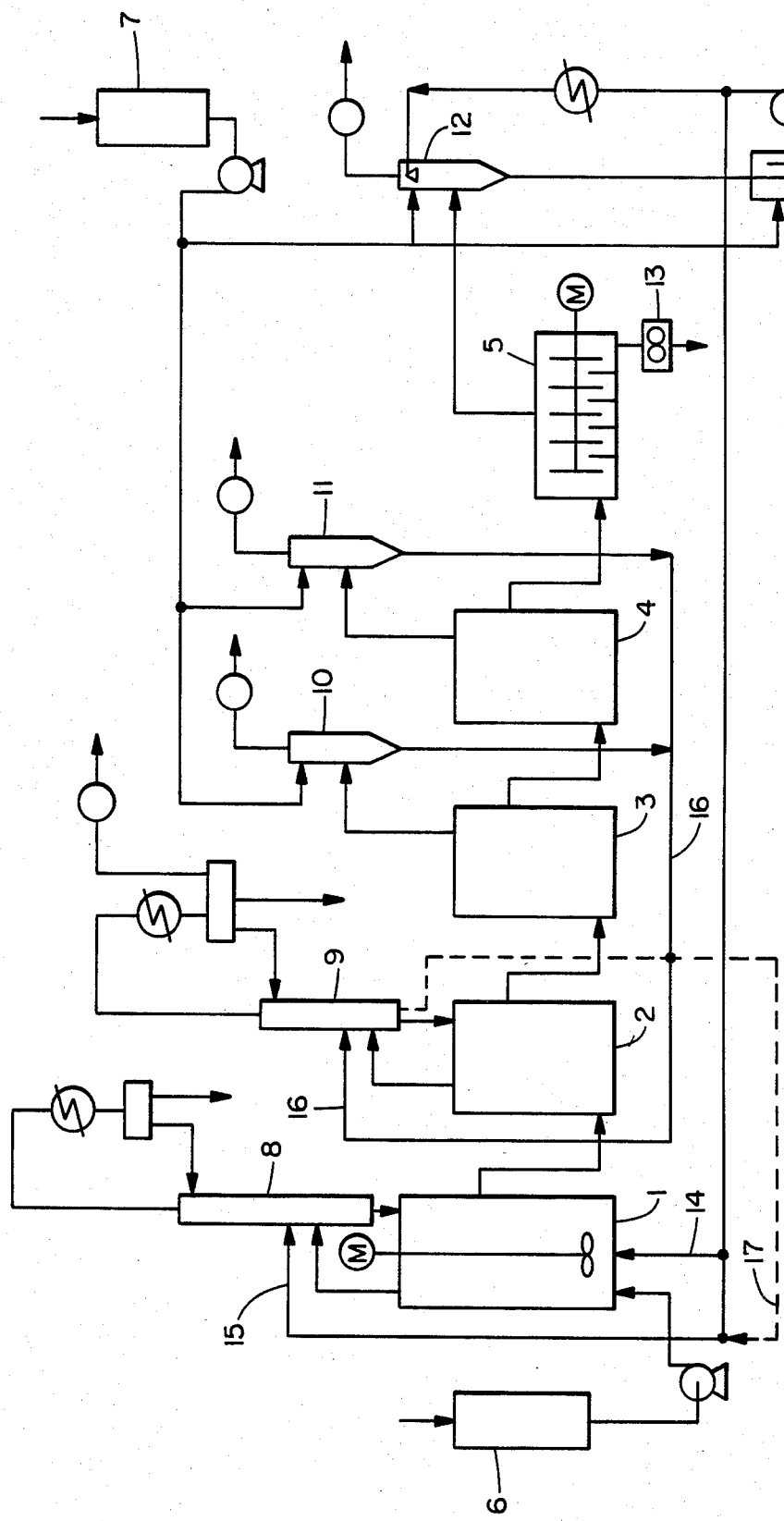

Referring now to the single FIGURE of the drawing which shows a flow diagram for the process of the invention, molten dimethyl terephthalate is fed from the receiving vessel 6 by a pump to the bottom of the first esterification reactor 1. This reactor is equipped with a stirrer driven by a motor. Recycled butanediol from condenser 12 is fed into the bottom of the reactor through line 14, and into the column 8 through line 15. Reactor 1 is maintained at superatmospheric pressure, preferably 1.2 to 1.6 bar absolute, and at a temperature between 160° C. to 180° C. The flow of reactants is controlled so the residence time in reactor 1 is about 80 minutes. The reaction, which is carried out in the presence of a catalyst under constant stirring, results in dimethyl terephthalate conversion of 72% to 92%, preferably 78% to 86%. The column 8 separates and condenses dimethyl terephthalate, butanediol and methanol, vaporized from the reaction chamber. Essentially pure methanol escapes from the top of the column 8 and is recovered. The higher boiling constituents which escape from the bottom of the column flow to the top of the reactor together with the butanediol from line 15. It will be noted that the recycled butanediol used in the first transesterification reactor comes from the condenser 12, which connects to the polycondensation reactor, as will be explained below. This butanediol has a sufficiently high degree of purity.

The reaction mixture flows continuously, due to the given pressure difference, and by means of a level control valve, to the lower end of the transesterification reactor 2 which is operated under a vacuum, preferably at 0.5 to 0.9 bar. Where low methanol contamination at column 8 is desired, 0.05 to 0.25 mol of butanediol per mol of dimethyl terephthalate is recycled to reactor 2 from the condensers 10,11 through the line 16 via the column 9 located above and connecting to the reactor 2. The temperature in this second stage transesterification reactor is between 180° C. and 210° C. Here again, the low-soluble esters which evaporate from the reactor 2 are condensed in column 9 and recirculated to the top of the reactor. Methanol is recovered together with tetrahydrofuran and water by well-known means. If methanol purity requirements at column 8 are of no concern, the column 9 is replaced by a condenser similar to the condensers 10,11. In this case, all butanediol collected in the substitute condenser and condensers 10,11 is recycled to reactor 1 via the line 17 and the column 8.

After a residence time in reactor 2 of approximately 50 minutes, the melt flows to the first precondensation reactor 3, which is maintained at a temperature ranging between 210° C. and 230° C., and at a pressure between 100 to 500 mbar. After a residence time of approximately 50 minutes, the transesterification of dimethyl terephthalate is about 97% complete. This melt then flows, due to the difference in pressure, into the second precondensation reactor 4. This reactor is maintained at a temperature between 230° C. to 255° C. and at a pressure of between 5 to 100 mbar.

It will be noted that both of the precondensation reactors are equipped with condensers 10,11 to which fresh butanediol is fed from the storage container 7 by means of a pump. The condensers 10,11 include a circulating system with an immersion vessel, a pump, a cooler (not shown), and the condenser itself. The butanediol containing low-soluble esters vaporized from the melt flows from the condensers 10,11 to the lines 16 through which the butanediol is fed either into the column 9 above the reactor 2, or with additional butanediol from substitute condenser (replacing column 9) into the column 8 above transesterification reactor 1 via lines 15,17. Since the condensers include a circulating system with a pump and a cooler, it is not important where the fresh butanediol is added. Additional process stages will permit increasing the temperature and decreasing the pressure by narrower steps.

Finally, the product from the last precondensation reactor 4 is polycondensed in reactor 5 which is described in U.S. Pat. No. 3,617,225. The pressure in reactor 5 is maintained at 0.2 to 25 mbar, and at temperatures ranging from 240° C. to 265° C. High molecular weight polybutylene terephthalate is discharged from the reactor by pump 13. As indicated previously, the vapors from the polycondensation reactor 5 are condensed in the condenser 12 by means of cooled butanediol which is sprayed into the condenser and diluted with fresh butanediol. The condensed mixture from condenser 12 is divided into two streams 14,15, one of which feeds directly into the first transesterification reactor 1 and the other of which feeds into the column 8.

The polybutylene terephthalate obtained according to the invention can be extruded as granules, fibers or foils. The granules are processed into molded articles primarily by injection molding. As desired, the polymers can be compounded with pigments or other additives such as glass fibers or flame protective agents. The polybutylene terephthalate can also be processed by blending with other polymers.

SPECIFIC EXAMPLE

Utilizing the apparatus shown in the drawing, 100 kg per hour of molten dimethyl terephthalate and 60.3 kg per hour of butanediol-1,4 (mol ratio 1:1.3) and 0.07 per hour of tetraisopropyl-0-titanate are fed into the first transesterification reactor. The butanediol is that which has been condensed in the condensates from the two precondensation reactors and the final polycondensation reactor, said condensers having been fed 50 kg per hour of fresh butanediol. Thus butanediol condensate contains terephthalate acid esters described above as low-soluble esters which were distilled off in these stages. The butanediol also contains small amounts of low-boiling constituents such as tetrahydrofuran, methanol and water.

The transesterification reaction takes place in the first stage at a temperature of 175° C. and a pressure of 1.3 bar absolute, with a residence time of 80 minutes. The dimethyl terephthalate is 83% converted. The reaction mixture is then passed into the second transesterification stage, which is maintained at a temperature of 193° C. and a pressure of 0.75 bar absolute, with a residence time of 50 minutes. The dimethyl terephthalate is 91% converted into this stage.

The methanol formed during the reaction and other low-boiling compounds are separated in the two transesterification stages with the aid of a column provided on the top of each and operated at superatmospheric pressure and below atmospheric pressure respectively.

The reaction mixture from rector 2 is then passed into the first precondensation stage where it reacts at a temperature of 220° C. and a pressure of 200 mbar, with a residence time of 50 minutes to 97% conversion of the dimethyl terephthalate. Thereafter, the melt is passed into the second precondensation stage where it reacts at a temperature of 240° C. and a pressure of 25 mbar, with a residence time of 60 minutes to a 99% conversion of the dimethyl terephthalate.

Finally, the precondensation is fed to the polycondensation reactor, which, as indicated, corresponds to the apparatus shown in U.S. Pat. No. 3,617,225. Here it is polycondensed at a temperature of 245° C. and a pressure of 2 mbar. The residence time is 180 minutes. The discs of the reactor rotate at a speed of 3.5 rpm, and the polybutylene terephthalate is continually discharged with the aid of a gear pump. The strands discharged from the pump are cooled in a water bath and cut into chips.

The resulting polybutylene terephthalate product has an intrinsic viscosity of 1.05, measured in a 0.5% solution in phenol-tetrachloroethane (3:2) at 25° C. The concentration of carboxyl groups is measured with 30 mval/kg.

The process yielded only 1.9 kg of tetrahydrofuran per 100 kg of dimethyl terephthalate. By comparison, the amount of tetrahydrofuran accumulated during the process cited in U.S. Pat. No. 4,056,514 amounts to 3 kg per 100 kg of dimethyl terephthalate. Hence, in accordance with the invention, the loss of butanediol amounts to 5.1 mol% based upon 100 mol of dimethyl terephthalate feed, whereas, in accordance with the prior art, the loss amounts to 9.2 mol% on the same basis. This reflects a considerable difference in the consumption of expensive butanediol.

The recirculation of the condensates is accomplished with a minimum expenditure of energy, since it is not necessary to purify the butanediol from the condensate. Furthermore, the low-soluble esters are completely dissolved in the butanediol at operating temperatures which permit the flow of the esters through the lines which the liquid butanediol, thereby avoiding vacuum failures, interruptions of production, clogging of vacuum pumps and other equipment. Furthermore, the invention permits avoidance of ester losses and reduction of the tetrahydrofuran formation. The use of high vacuum up to 0.2 mbar results in high solution viscosities of the polymer products corresponding to intrinsic viscosities up to 1.25. At a higher polycondensation temperature and an increased pressure, preferably between 10 to 20 mbar, the concentration of carboxyl groups can be increased to 80 mval/kg at intrinsic viscosities in the range of 0.7 to 0.9.

We claim:

1. In a continuous process for producing polybutylene terephthalate of high molecular weight in a plurality of stages, during which the temperature is progressively increased from 160° C. to 260° C. by transesterifying dimethyl terephthalate with an excess of butanediol-1,4 in the presence of a titanium catalyst at superatmospheric pressure, then precondensing and polycondensing at subatmospheric pressure the terephthalic acid ester thus produced, the improvement which comprises
    (a) condensing the vapors volatilized during said precondensation and polycondensation steps, which vapors contain a major proportion of butanediol-1,4, by contacting said vapors with fresh butanediol-1,4 and
    (b) recycling the condensed volatilized and fresh butanediol-1,4 to the transesterification stage for reaction with dimethyl terephthalate.

2. The process of claim 1 in which said condensed butanediol-1,4 is recycled without purification.

3. The process of claim 1 in which said recycled butanediol constitutes the entire quantity necessary for the transesterification reaction.

4. The process of claim 1 in which the transesterifying stage utilizes a column for refluxing volatilized reactants, and said recycled butanediol-1,4 is fed partly into said column and partly into the transesterification product itself.

5. The process of claim 1 in which said precondensation stage is carried out at a pressure of 5 to 500 mbar and a temperature of 210° C. to 255° C., and said polycondensation stage is carried out at a pressure of 0.2 to 25 mbar and a temperature of 240° C. to 265° C.

6. The process of claim 1 in which transesterification is carried out in two steps, the first step at superatmospheric pressure below 180° C., the second step at subatmospheric pressure at a temperature of between 180° C. and 210° C.

7. The process of claim 1 in which the vapors condensed in step (a) include low-soluble esters containing almost one terephthalic acid group per molecule and the temperature of the fresh butanediol is maintained sufficiently high to keep said esters in solution.

* * * * *